April 22, 1952 G. O. EASTMAN 2,593,423
SAFETY VALVE
Filed Sept. 29, 1947

Inventor
Gilbert O. Eastman

By Clarence A. O'Brien
and Harvey B. Jacobson
Attorneys

Patented Apr. 22, 1952

2,593,423

UNITED STATES PATENT OFFICE 2,593,423

SAFETY VALVE

Gilbert O. Eastman, San Antonio, Tex.

Application September 29, 1947, Serial No. 776,721

1 Claim. (Cl. 137—69.5)

This invention relates to new and useful improvements in safety valves, and the primary object of the present invention is to provide a release valve for pneumatic tires so designed as to permit excessive pressure built up in a tube during use to be relieved therefrom, so that failure of the tire or inner tube will be prevented.

Another important object of the present invention is to provide a release valve including a spring-urged safety valve, a member receivably engaged on said safety valve and novel and improved means for adjusting said member, for selective adjustment of said safety valve.

A further object of the present invention is to provide a safety valve all elements of which are quickly and readily disassembled for cleaning or replacement of parts.

A further aim of the present invention is to provide a safety valve that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
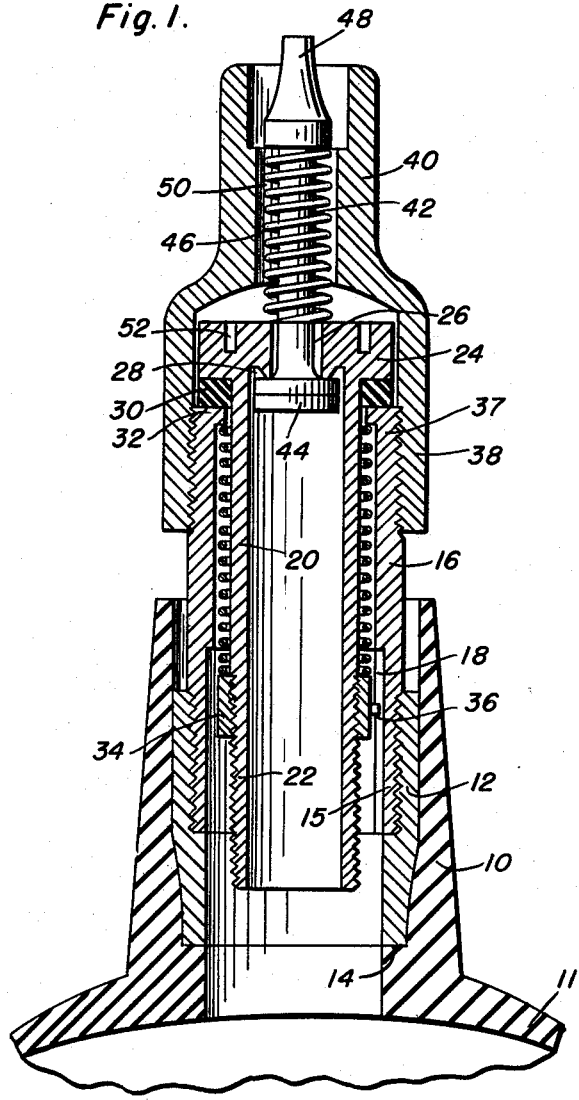
Figure 1 is a fragmentary side elevational view of an inner tube, showing the present safety valve applied thereon for use, and with parts of the tube and safety valve broken away and shown in section.
Figure 2:
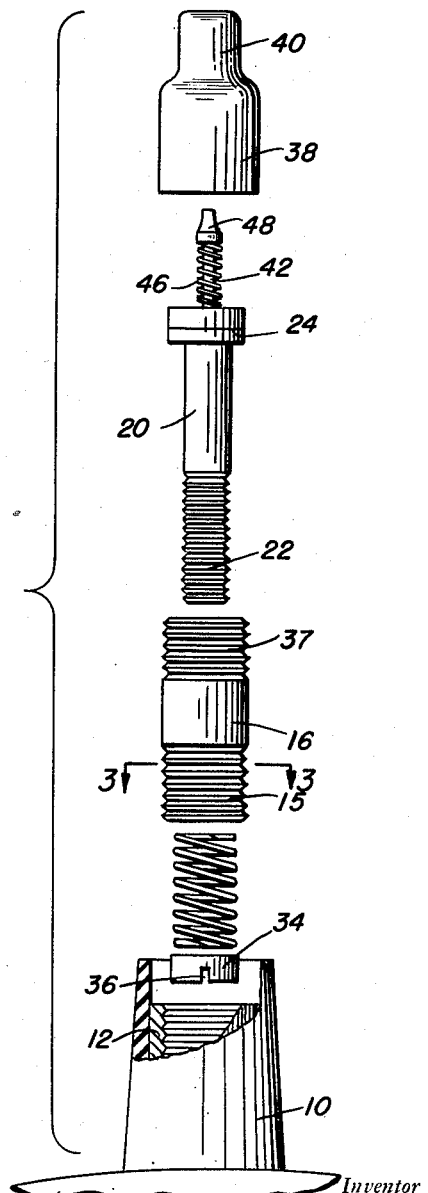
Figure 2 is a group perspective view of the present invention removed from the neck of an inner tube, and with parts of the neck broken away and shown in section.
Figure 3:
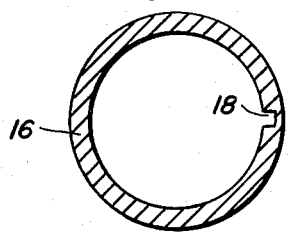
Figure 3 is a transverse horizontal sectional view taken substantially on the plane of section line 3—3 of Figure 2.

Referring now to the drawings in detail wherein, for the purpose of illustration, there is disclosed a preferred embodiment of the present invention, the numeral 10 represents the resilient neck of an inner tube 11, in which there is frictionally held an internally threaded insert 12, with the lower end of the insert bearing upon an annular shoulder 14 within the neck.

Receivably engaging the insert 12 is the inner, externally threaded end 15 of a sleeve 16 that is provided with an internally formed longitudinal groove 18.

The numeral 20 represents a tubular safety valve that is externally threaded at its lower end 22 and provided with a flanged head 24 at its outer end and having a central inflation opening 26 provided with an internal valve seat 28. Normally, the flanged head is seated upon a gasket 30 bearing upon the outer end 32 of the sleeve 16.

Receivably engaging the threaded inner end 22 of the sleeve 20 is a retaining nut 34 provided with an outwardly projecting lug or pin 36 that slidably engages the internal groove 18 that is provided in the inner periphery of the safety valve 20.

Removably mounted on the outer end 37 of the safety valve 20 is the internally threaded, enlarged end 38 of a closure cap or sleeve 40 that encloses the head of the safety valve 20 and an inflation valve 42 that is slidably mounted in the opening 26 provided in the head of the safety valve. This valve 42 includes an enlarged annular inner portion 44 that normally bears against the valve seat 28 due to the urging from a coil spring 46 that is biased between the outer head portion 48 of the valve and the inner portion 44.

In practical use of the device, when the nozzle of an air hose (not shown) is placed on the reduced end of cap 40, air pressure in the air hose will force the inflation valve downwardly so that air may enter opening 26, sleeve 20 and into the neck 10 of the tube to inflate the tube.

When the pressure in the tube is increased due to excessive rotation of the tube, the air will enter between the sleeve 16 and the safety valve 20, and force the safety valve upwardly, so that air may enter the port 50 in the head 40 between the flanged head 24 and the enlarged end 38 of the cap 40.

It should be noted that tool-engaging apertures 52 are provided in the flanged head 24 so that when the cap 40 is removed from the sleeve 16, the safety valve 20 may be rotated, without rotation of the nut 34. In this manner, a selective adjustment may be made of the yielding force of spring 44 upon the safety valve.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

An inflation-relief valve comprising an elongated sleeve having inner and outer end portions, an internal rib at the outer end portion of said sleeve, said sleeve having a longitudinal internal groove at its inner end, a tube slidably received in said sleeve and including inner and outer ends, the inner end of said sleeve being externally threaded, an abutment nut threaded on the inner end of said sleeve and including a radially projecting lug slidably received in said groove, a coil spring embracing said tube and biased between said nut and said rib, said tube having a flanged head overlying the outer end of said sleeve, a gasket about the outer end of said tube beneath said flanged head, said spring urging said flange head and said gasket toward the outer end of said sleeve, said flanged head including an internal valve seat, a valve stem slidably carried by the flanged head, said stem including inner and outer enlarged end portions, and a spring member embracing the stem and biased between the outer end portion of said stem and the flanged head to urge the inner end portion of said stem against said seat.

GILBERT O. EASTMAN.

REFERENCES CITED

The following references are of record in the file of this patent:

UNITED STATES PATENTS

| Number | Name | Date |
| --- | --- | --- |
| 365,656 | Warren | June 28, 1887 |
| 824,669 | Moneuse | June 26, 1906 |
| 973,440 | Kessler | Oct. 18, 1910 |
| 1,064,526 | Noe | June 10, 1913 |
| 1,334,985 | Brown | Mar. 30, 1920 |
| 2,006,141 | Hussey | June 25, 1935 |